United States Patent [19]
Wittes

[11] 3,906,148
[45] Sept. 16, 1975

[54] FOIL CONNECTOR

[75] Inventor: James M. Wittes, Linden, N.J.

[73] Assignee: Thomas & Betts Corporation, Elizabeth, N.J.

[22] Filed: Mar. 14, 1974

[21] Appl. No.: 451,095

[52] U.S. Cl. ............... 174/84 R; 29/628; 174/94 R; 339/95 A; 339/97 R; 339/17 F
[51] Int. Cl.² ......................................... H02G 15/08
[58] Field of Search ........ 174/84 C, 84 R, 90, 94 R; 339/95 R, 95 A, 97 R, 97 P, 98, 99 R, 276 R, 276 T, 223 R, 17 F, 214 R, 214 C, 215 R; 29/628

[56] References Cited
UNITED STATES PATENTS

| | | | |
|---|---|---|---|
| 3,138,658 | 6/1964 | Weimer, Jr. | 174/94 R |
| 3,388,369 | 6/1968 | Zalmans | 174/94 R X |
| 3,541,226 | 11/1970 | Cea et al. | 174/94 R X |

*Primary Examiner*—Darrell L. Clay
*Attorney, Agent, or Firm*—David Teschner; Jesse Woldman

[57] ABSTRACT

A connector for connecting an insulated, pliable, foil conductor to a termination point which may be, for example, a source of electrical current. A pointed conical base portion serves as an anvil for tearing through and segmenting the foil conductor and receiving the teeth of an overlying clamping portion. The teeth scrub the foil surface removing any insulation or oxide films thereon and make good contact with the conductor as the teeth wedge against and imbed themselves in the base portion, locking the two portions together. A conductor cavity in the clamping portion permits a conductor to be crimped thereto to facilitate connection to a termination point. An insulated cover provides the desired electrical and moisture sealing for the joint.

Alternatively, a carrier, forming the insulated cover of a clamping portion and a releasable retainer for a base portion may be used to provide all components of the connector as a single unit and to permit insulation of any exposed conductor edge.

9 Claims, 8 Drawing Figures

PATENTED SEP 16 1975

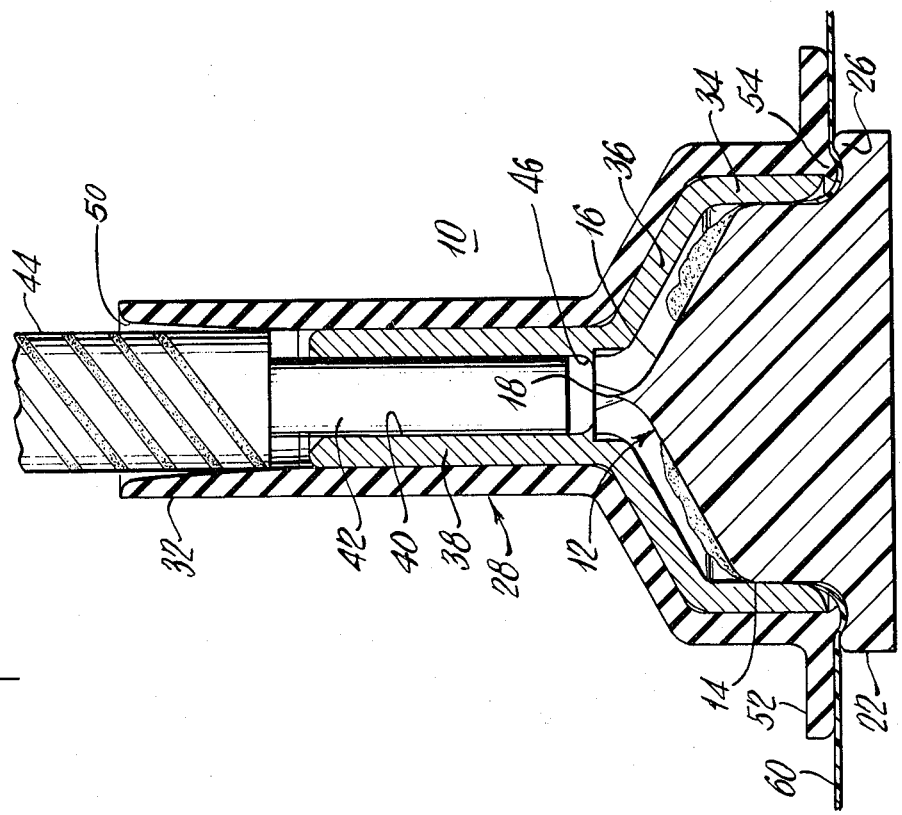
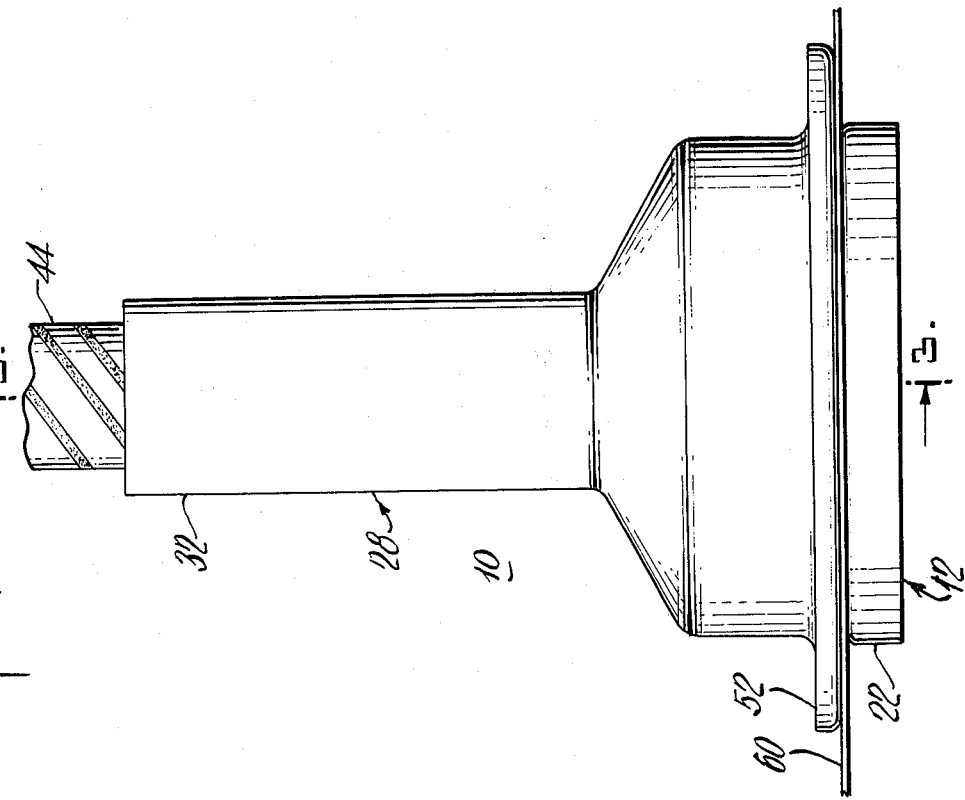

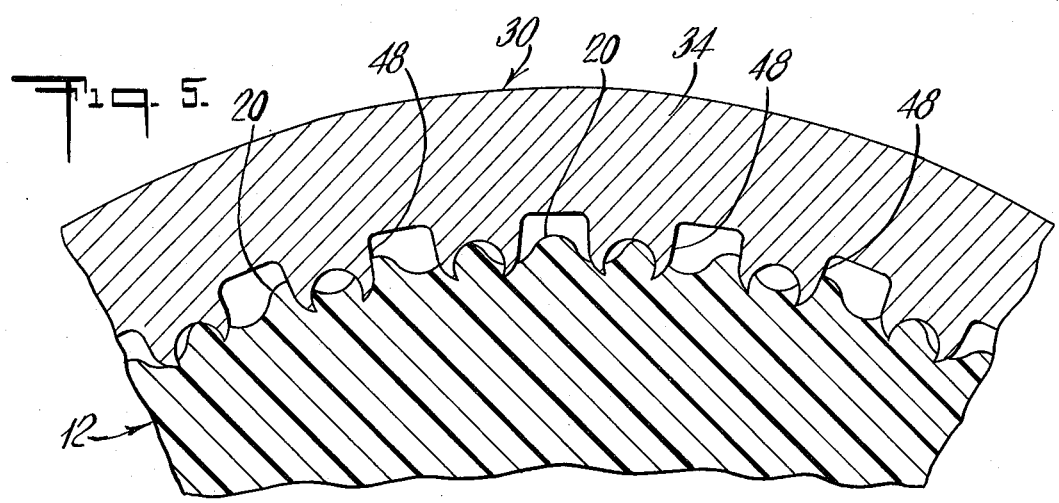
Fig. 5.
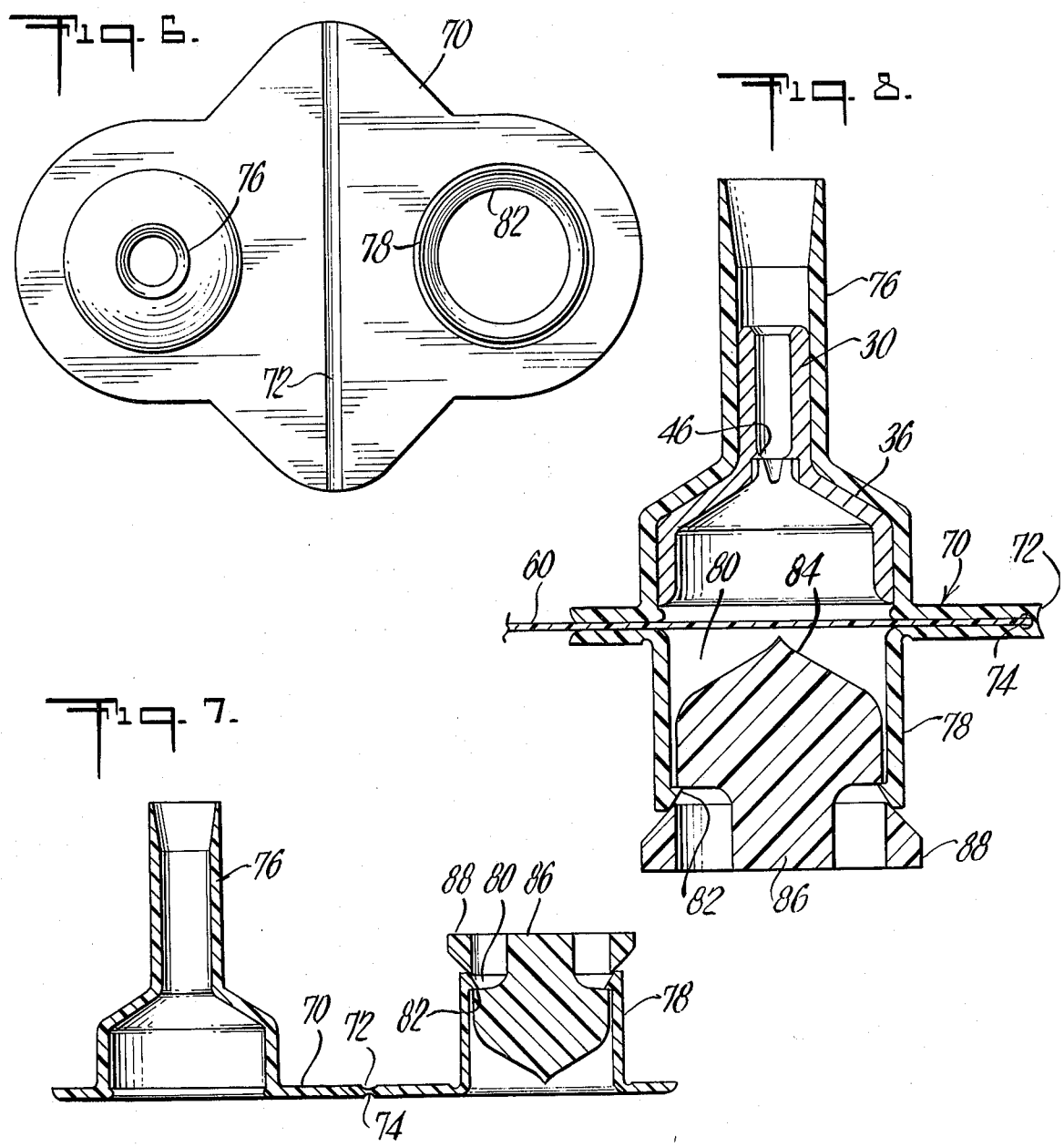
Fig. 6.
Fig. 8.
Fig. 7.

FOIL CONNECTOR

BACKGROUND OF THE INVENTION

1. Field of the Invention

The invention is directed to the field of terminating insulated foil conductors as are found on heating films used for industrial and residential heating. The foil films are used to carry current to such heating films from a source of electrical current outside of the wall or ceiling in which such films are found.

2. Description of the Prior Art

According to prior art techniques used for terminating such films it was necessary to remove the insulation from at least one surface of such films in order to expose the material of the pliable conductor found thereunder. Next, it was necessary to remove the insulation from the edge so as to leave the film conductor completely exposed on at least one edge and one surface. Then, a connector having two overlying portions, a first of which having teeth and a second having apertures therein to receive the teeth once the teeth have been passed through the foil conductor, and a wire receiving cavity remote from said overlying portion to receive a conductor to be used to couple the connection to an electrical source. Firstly, because of the very thin nature of the insulating films and the foil conductor itself, it was necessary to very carefully and time consumedly remove the insulating film, or layer, from one surface of the conductor. Secondly, since the conductor often was of aluminum, it was necessary that the oxide be removed from the surface thereof. Then it was necessary that the connector be very carefully installed so that the teeth would go through the film conductor and enter the apertures of the overlying portions of the connector. The protruding teeth were then riveting in such a manner as to lock together the two component overlying portions of the connector. The action of riveting the two portions together had to be severe enough to permit the breakdown of all aluminum oxides which might be formed on the surface, but not so severe as to cause a severing of that portion of the foil conductor within the connector from the remaining portion of the foil conductor. When the installation of the connector was completed it was then necessary to insulate the joint thus formed to prevent shorting to other adjacent foil conductors and connections.

SUMMARY OF THE INVENTION

The present connector overcomes the difficulties noted above with respect to prior art devices by providing a connector which can be readily installed to an insulated foil conductor without the requirements for first removing the insulation from the conductor and then requiring that the overall joint formed be insulated. A connector for connecting an insulated, pliable, foil conductor to a termination point which may be a source of electrical current is formed of a pointed conical base portion which serves as an anvil for the tearing through and segmenting of the foil of the conductor and the receiving of the teeth of an overlying clamping portion. The teeth serve to scrub the surface of the foil, thereby removing the insulation and removing any oxide which might be present thereon to permit the making of a good electrical connection therewith, as well as providing the necessary locking between the clamping portion and the base portion. The teeth act to wedge the foil segments resulting from the piercing and tearing against the base portion as well as embed themselves in the base portion which is made of a material somewhat softer than the metal material of which the clamping portion is formed. A conductor portion is provided at the remote end of the clamping portion to receive therein, in crimping engagement, a conductor so that the overall joint may be connected to a source of electrical current. An insulated cover provides the desired electrical protection and moisture sealing required for the joint. In a further form, as is described below, a carrier is arranged to provide both the insulating cover for the clamping portion and a releasable retainer for the base portion and the same may be used to provide the connector as a single unit and to position the base portion with respect to the clamping portion for assembly and to provide the necessary insulation for the joint created thereby. It is therefor an object of this invention to provide an improved connector for a pliable conductor.

It is another object of this invention to provide an improved connector for a pliable foil conductor.

It is still another object of this invention to provide an improved connector for an insulated pliable foil conductor.

It is yet another object of this invention to provide an improved connector for insulated pliable foil conductors to permit the connection of such conductors to a source of electrical current.

It is still another object of this invention to provide an improved connector for insulated pliable foil conductors which does not require prior removal of the insulation of the foil conductor and which does not require insulation of the joint after installation of the connector.

It is yet another object of this invention to provide an improved insulated connector for a pliable foil conductor carried by a unitary carrier strip which provides a retaining device for the clamping portion of the connector and a releasable retaining member for the base portion of the connector such that when the carrier means is folded about a hinge portion thereof the clamping portion and base portion are properly aligned for connection to the foil conductor and the foil conductor, including the edge thereof, is insulated once the joint has been completed.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

In the drawings in which similar elements are given similar reference characters.

FIG. 2 is a front elevational view of the connector of FIG. 1 shown assembled to the foil conductor.

FIG. 3 is a side elevational view of the installed connector of FIG. 2, in section, taken along the lines 3—3 of FIG. 2.

FIG. 5 is a top fragmentary view, in section, of the engagement of the teeth of the clamping portion with the base portion of the connector of FIG. 1.

FIG. 6 is a top plan view of the carrier means of an alternative form of the connector constructed with the concepts of the invention.

FIG. 7 is a front elevational view in section of the carrier strip of FIG. 6 showing the insertion of a base portion of the connector.

FIG. 8 is a front elevational view of a carrier strip mounted connector positioned about a foil conductor prior to the completion of the connection operation.

Figure 1:
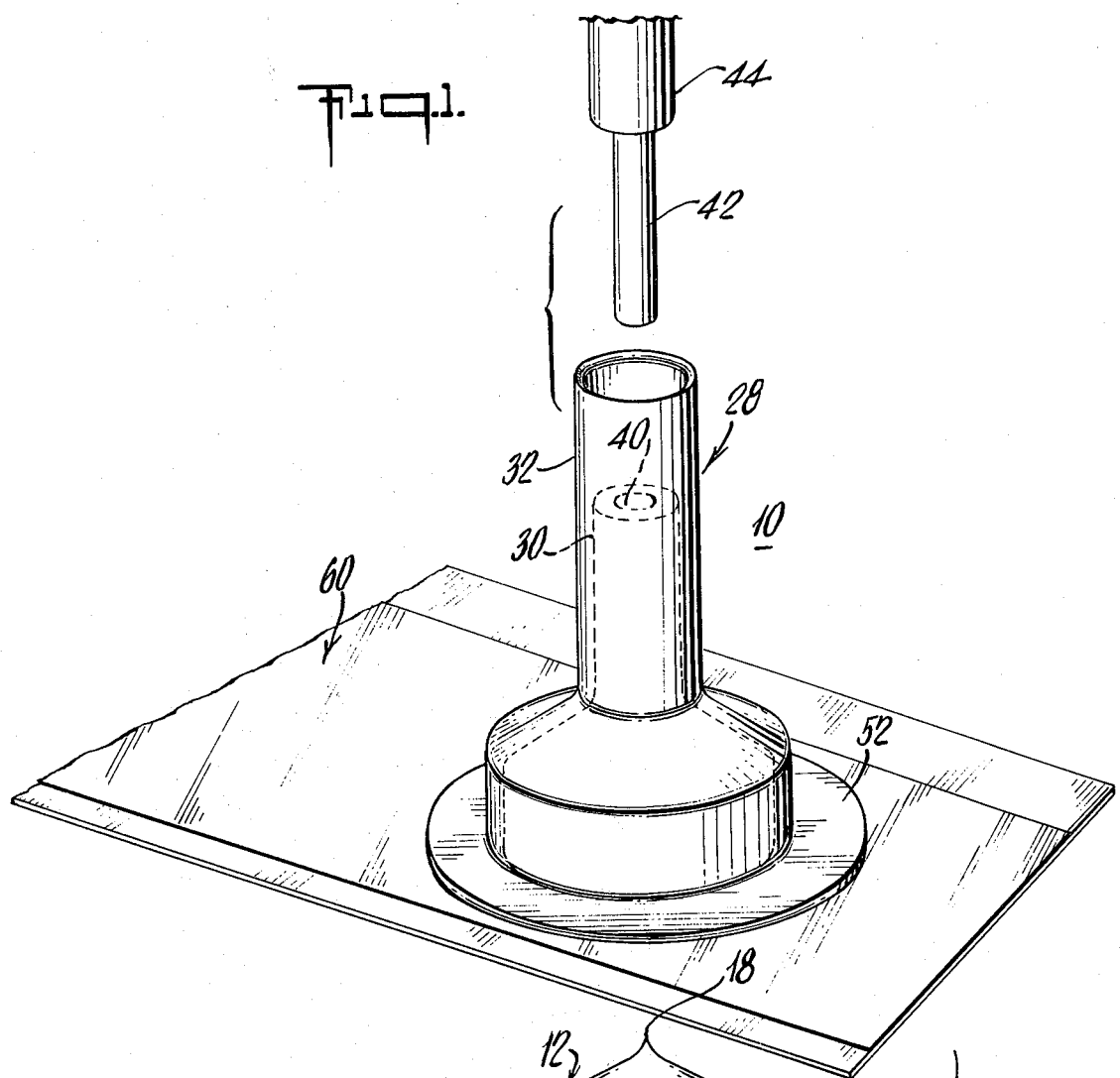
FIG. 1 is an exploded front isometric view of the connector of the instant invention shown in relation to a foil conductor to which it is to be installed.

DESCRIPTION OF THE PREFERRED EMBODIMENT:

Turning now to FIGS. 1 through 5 there is shown a connector 10 constructed in accordance with the concepts of the invention. Connector 10 is fabricated from a base portion 12 having a generally cylindrical portion 14 and a conically tapered portion 16 terminating at a sharp point 18. As will be described below in greater detail, the point 18 is used to pierce through the metallic film and insulation of an insulated pliable foil conductor, which conductor is then torn and spread by the conical surface 16 leading from the point 18. As is shown in FIG. 1, a plurality of flutes 20 are placed around the cylindrical surface 14 of the base portion 12. These flutes, as will be described below with reference to FIG. 5, provide for the trapping-wedging operations for the foil as well as the locking operation necessary to hold the base portion and clamping portion together. Generally, in order to provide an insulated member, the base portion 12 is constructed of a plastic, rubber, or other insulation type material. However, such construction is not necessary in that it may be made of metal and later insulated or provided with an insulated cover. Generally, the flutes 20 may be omitted if the teeth of the clamping portion, as will be described below, are of sufficient hardness. The clamping member teeth may be of work hardened material, therefor harder than the metal of which the base portion is constructed and still will function in a satisfactory manner. Positioned about the lower portion of the base portion 12 is an annular ring 22 which will cooperate with a flange of the clamping portion providing a moisture seal juncture between the connector 10 and the foil conductor 60. In those usages of the connector where moisture protection is not necessary, the annular ring 22 may be omitted, as is shown in FIG. 2, with respect to the base portion 24. As can be better seen in FIG. 3 annular ring 22 has an annular recess 26 therein to cooperate with a flange of the insulating jacket of the connector yet to be described.

The next major assembly of the connector 10 is the clamping portion 28 consisting of a metallic clamping member 30 with an insulating jacket 32 thereover. The clamping member 30 is constructed of a cylindrical portion 34 and a conical portion 36 having similar tapers and arranged to align with the surfaces 14 and 16 respectively of the base portion 12. Further, cylindrical extension 38 is provided with a cavity 40 for receipt therein of the bared end 42 of a conductor 44. A series of wire stops 46 are provided at the base of the cylindrical portion 38 to limit the insertion of the bared portion 42 of the conductor 44. A crimping tool can now be placed about the cylindrical portion 38 metallic portion 30 and operated to crimp portion 38 to the bared portion 42 of the conductor 44.

Figure 4:
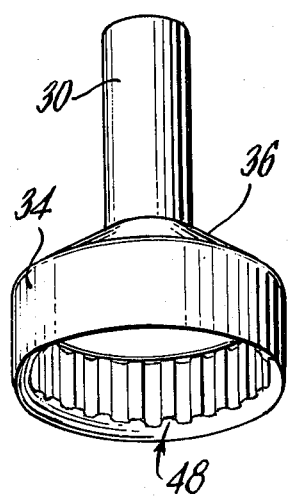
FIG. 4 is a perspective view, taken from below, of the clamping portion of the connector of FIG. 1.

As can be seen from FIG. 4, the inner surface of the cylindrical portion 34 of the metallic clamping portion 30 is formed with a series of teeth 48 the purpose of which is to engage the surface of the pliable foil conductor, to strip the insulation therefrom and to scrape any oxides or other contaminants therefrom and to make a good wedging contact with it as engagement is forced between the teeth 48 of the metallic clamping portion 30 and the outer surface upon the cylindrical portion 14 of the base portion 12. As is seen in FIG. 5 the base portion 12 has been shown with a series of flutes 20 about its outer surface. Generally, the inner surface of the clamping member 30 has been shown to have a series of teeth 48 arranged in pairs separated by recesses therebetween. The individual teeth of the pairs are permitted to operate singly or in combination so as to trap therebetween portions of the foil conductor and also portions of the surface of the base portion 12. It should be understood, as was explained above, that the surface of the base portion 12 may be provided with flutes or without flutes providing the teeth 48 of the clamping member 30 are sufficiently hard and dimensioned so as to provide an interference fit with the portions of the foil conductor therebetween. Therefore, any combination of plastics and metals may be used for the respective pieces providing the teeth 48 are of sufficient magnitude, hardness and arrangement to provide for the necessary locking, wedging action required to hold the clamping portion 28 to the base portion 12. In the preferred embodiment the base portion 12 is constructed of plastic and the clamping member 30 is constructed of metal. The action of the teeth 48 will be such as to, in some instances, cut into and bite into the plastic embedding themselves therein and in other instances merely to have an interference fit or tight fit with certain of the flutes 20 or recesses therebetween. The portions of the foil conductor may be gathered in between the teeth and will be held by the wedging or embedding action of the teeth 48, with respect to the flutes 20 of the base portion 12.

Set atop the clamping portion 30 is an insulating sleeve or jacket 32 conforming generally to the shape of the metallic clamping portion 30. Insulating jacket 32 extends beyond the mouth of the clamping portion 30 and cavity 40 is tapered as at 50 (see FIG. 3) to give easy access to the conductor of the clamping member 30. Further, at the ends opposite the conductor entrance there is a flange 52 extending about the entire surface of the jacket 32 which flange 52 terminates in a heel 54 arranged to engage the recess 26, of the annular ring 22 of the base portion 12. The displacement of the foil conductor 60 as it fits between the heel 54 and the recess 26 will provide necessary moisture sealing against moisture extending along the surface of the foil conductor.

Now that the individual components have been described, the manner of installation of the connector 10 of FIG. 1 to a foil conductor 60, (as is shown in FIG. 1) can be described. With no prior preparation, that is without the removal of any of the insulation upon the surfaces of the foil conductor, the assembled clamping portion 28 consisting of the inner metallic clamping member 30 and the outer insulating jacket 32 are placed atop the surface of the foil conductor 60. Then from below, the base portion 12 is inserted in such a manner that it will pierce through the film conductor 60 and will position itself within the cylindrical portion 34 of the clamping member 30. The intrusion of the point 18 of the base portion 12 will merely cause the puncture of the conductor material. The attempted further intrusion of the base portion 12 into the foil conductor 60 will cause it to be stretched and torn as the surface 16 of the base portion is intruded into the puncture created by the point 18. The tearing operation will provide a number of flaps, which flaps will be trapped between the conical surfaces 16 of the base portion 12 and 36 of the clamping portion 30. Additional portions of the foil connector will be trapped between the flutes 20 of the base portion 12 and the teeth 48 of the clamping member 30, as has been described above. At this point, the base portion 12 and the clamping portion 28 have been joined together and portions of the conductive foil conductor are trapped between and a good electrical contact made therewith. Finally, the bared end 42 of a conductor 44 will be inserted within the insulating jacket 32 into the wire receiving cavity 40 of the cylindrical portion 38 of the clamping portion 30. By means of a crimping tool (not shown) the cylindrical portion 38 is crimped about the bare portion 42 of the conductor 44 to make a good mechanical joint therewith. As was described above with respect to the heel 54 and the recess 26 of the base portion 12, the foil conductor 60 will be caused to follow the path of the heel 54 and thereby provide a moisture seal at this point. No further insulation of the joint is necessary and the operation has been completed without the requirement for the skinning of the insulation from the foil conductor before installation and for insulating the joint once it has been completed.

Thus far there has been considered the connecting to the pliable foil conductor at a point along it's length an edge thereof, where it is not necessary to provide insulation for the joint beyond that provided by the connector itself. However, when it is necessary to terminate the foil conductor at either the leading or trailing edge thereof, as with the initial lead-in of current or provision for a return path the problem of insulating the edge, other wise left exposed, becomes apparent. Using the connector described to this point, it is required that separate insulation be added to the edge after the connector is in place. As was described above with respect to prior art devices, such post installation insulation is very time consuming and produces a joint which was not totally satisfactory. With a modification of the invention it is possible to provide a connector for connection to the edges of a pliable foil conductor in such a manner as to provide insulation for the otherwise exposed edges of the foil conductor.

A modification of the connector is that as shown in FIGS. 6, 7, and 8 comprises a carrier strip 70 having a central hinge line 72 about which the individual halves of the carrier strip 70 may be folded, as is shown in FIG. 8, to protect the ends 74 of a pliable foil conductor 60. As is best seen in FIG. 7, the left hand portion of the carrier strip 70 is formed to provide an insulating jacket 76 of a plastic material, having generally all of the configuration details as was shown with respect to jacket 32 of FIG. 3. In FIG. 3 the jacket 32 was shown to be constructed of a rubber material whereas in FIG. 7 the jacket 76 is shown to be made of plastic. Any material which will provide the necessary insulating properties may be employed. In this instance, that is, with respect to FIG. 7, it is simpler to fabricate the entire structure using one single material. After the molding operation has been completed for the carrier strip 70 a metallic clamping member such as 30, discussed above with respect to FIG. 3, will be inserted as is seen in FIG. 8. On the right hand portion of the strip 70 there is formed a hub 78 having a central bore 80 extending therethrough. An annular ring 82 is formed adjacent the free ends of the hub 78 whereby a restriction for objects moving into and out of the central bore 80 is provided. The modified base portion 84 is formed with an extending portion 86 to which is coupled an annular ring portion 88 coupled to the extending portion 86 by two spoke portions not visible in the figures. Once the molding operation has been completed for the carrier strip 70 an outer clamping portion 30 will be inserted in the left hand portion within the jacket 76, as was described above, and then the base portion 84 will be inserted such that the main bulk of the base portion 84 will be within the bore 80 of the hub 78. The annular ring portion 88 will extend beyond the free ends of the hub 78. In this manner, as is shown in FIG. 7, the annular ring restriction 82 of the hub 78 will extend between the main portion of the body portion 84 and the annular ring portion 88. This will prevent the unwanted movement of the base portion 84 either into or out of the bore 80 of the hub 78 until such movement is desired.

In order to employ the connector it is necessary only that the web 70 be folded about its hinge line 72 and that the end 74 of the foil conductor 60 be inserted right up to the hinge line 72. With the web 70 thus folded upon itself, in the manner shown in FIG. 8, the foil connector 60 will be held in a taut condition and the proper positioning between the base portion 84 and the clamping portion 28 will be established. It is only necessary then to push upon the central portion 86 of the base portion 84 to cause the spokes attaching the base portion 84 to the annular ring 88 to be severed permitting the base portion 84 to be propelled through the conductor and to take its position within the clamping member 30, as was described above with respect to FIG. 3. Now when completed, the installation gives a joint which provides full insulation for the otherwise exposed edges of the foil conductor without the requirement that it be insulated after the connection has been completed. This arrangement also offers other advantages in that the component portions of the connector are always available as a unit and there is little danger of separation or loss of component portions. Also, by properly positioning all components there is little difficulty with possible tearing or destruction of the foil and improper joinder of the base portion with the clamping portion.

While there have been shown and described, and pointed out the fundamental novel features of the invention, as applied to the preferred embodiments, it will be understood that various omissions and substitutions and changes of the form and details of the devices illustrated and in their operation may be made by those skilled in the art, without departing from the spirit of the invention.

The embodiments of the invention in which the exclusive property or privileges are claimed are defined as follows:

1. A joint between a pliable conductor and a termination point comprising; a pliable conductor; a base portion made from an insulating material; a clamping portion made of metal; said pliable conductor positioned intermediate said base portion and said clamping portion; said clamping portion having means to lock said clamping portion to said base portion with at least a portion of said pliable conductor entrapped therebetween; an insulating means about said clamping portion to fully insulate said joint; said clamping portion having a conductor receiving cavity therein to receive a conductor therein; and a length of conductor having a first end and a second end, said first end coupled to a termination point and said second end positioned in said conductor receiving cavity.

2. A joint between a pliable conductor and a termination point comprising: a pliable conductor; a base portion made from an insulating material; a clamping portion made of metal; said pliable conductor positioned intermediate said base portion and said clamping portion; said clamping portion having means to lock said clamping portion to said base portion with at least a portion of said pliable conductor entrapped therebetween; said means to lock comprising a plurality of teeth formed on an interior surface of said clamping means, said teeth engaging said pliable conductor and wedging and engaging said base portion when said clamping portion and base portion are assembled with a portion of said pliable conductor therebetween said clamping portion having a conductor receiving cavity therein to receive a conductor therein; and a length of conductor having a first end and a second end, said first end coupled to a termination point and said second end positioned in said conductor receiving cavity.

3. A joint as defined in claim 2, further comprising insulating means about said clamping portion.

4. A joint between a pliable conductor and termination point comprising; a pliable conductor; a base portion made from an insulating material; said base portion having a generally conical shape terminating in a sharp point for piercing through said pliable conductor; said conical shape causing said pliable conductor to stretch and tear as said pliable conductor is advanced along said base portion; a clamping portion made from metal; said pliable conductor positioned intermediate said base portion and said clamping portion; said clamping portion having means to lock said clamping portion to said base portion with at least a portion of said pliable conductor entrapped therebetween; said means to lock comprises a plurality of teeth formed on an interior surface of said clamping means, said teeth engaging said pliable conductor and wedging and engaging said base portion when said clamping portion and base portion are assembled with a portion of a pliable conductor therebetween; said clamping portion having a conductor receiving cavity therein to receive a conductor therein; and a length of conductor having a first end and a second end, said first end coupled to a termination point and said second end positioned in said conductor receiving cavity.

5. A joint as defined in claim 4 wherein said base portion has a plurality of ribs about an exterior surface thereof arranged to be positioned adjacent said teeth of said clamping portion when same are assembled to facilitate the operation of said locking means.

6. A joint as defined in claim 4, further comprising insulating means about said clamping portion.

7. A joint between a pliable conductor and a termination point comprising: a pliable conductor; a base portion; a clamping portion; said pliable conductor positioned intermediate said base portion and said clamping portion; said clamping portion having means to lock said clamping portion to said base portion with at least a portion of said pliable conductor entrapped therebetween; said clamping portion having a conductor receiving cavity therein to receive a conductor therein; a length of conductor having a first end and a second end, said first end coupled to a termination point and said second end positioned in said conductor receiving cavity; carrier means made from insulating material for carrying said base portion and said clamping portion as a single unit before assembly and for positioning said base portion with respect to said clamping portion prior to actual assembly; said carrier means comprising; first retainer means for retaining said clamping portion, said first retainer means providing insulating means about said clamping portion and second retainer means for retaining said base portion; said carrier means being provided with hinge means intermediate said first and second retainer means to permit said base portion to be positioned adjacent said clamping means.

8. A joint between a pliable conductor and a termination point comprising: a pliable conductor; a base portion; a clamping portion; said pliable conductor positioned intermediate said base portion and said clamping portion; said clamping portion having means to lock said clamping portion to said base portion with at least a portion of said pliable conductor entrapped therebetween, said clamping portion having a conductor receiving cavity therein to receive a conductor therein; a length of conductor having a first end and a second end, said first end coupled to a termination point and said second end positioned in said conductor receiving cavity; carrier means made from insulating material for carrying said base portion and said clamping portion as a single unit before assembly and for positioning said base portion with respect to said clamping portion prior to actual assembly; said carrier means comprising; first retainer means for retaining said clamping portion and second retainer means for retaining said base portion; said base portion being releasably held in said second retainer means; said carrier means being provided with hinge means intermediate said first and second retainer means to permit said base portion to be positioned adjacent said clamping means.

9. A joint between a pliable conductor and a termination point comprising: a pliable conductor; a base portion; a clamping portion; said pliable conductor positioned intermediate said base portion and said clamping portion; said clamping portion having means to lock said clamping portion to said base portion with at least a portion of said pliable conductor entrapped therebetween; said clamping portion having a conductor receiving cavity therein to receive a conductor therein; a length of conductor having a first end and a second end, said first end coupled to a termination point and said second end positioned in said conductor receiving cavity; carrier means made from insulating material for carrying said base portion and said clamping portion as a single unit before assembly and for positioning said base portion with respect to said clamping portion prior to actual assembly; said carrier means comprising; first retainer means for retaining said clamping portion; said first retainer means providing insulating means about said clamping portion; and second retainer means for retaining said base portion; said base portion being releasably held in said second retainer means; said carrier means being provided with hinge means intermediate said first and second retainer means to permit said base portion to be positioned adjacent said clamping means; the web of said carrier means between said first and said second retainer means providing insulation for said pliable conductor placed between said carrier means portions when said carrier means is folded about said hinge means.

* * * * *